United States Patent [19]

Rodriguez et al.

[11] 4,439,085
[45] Mar. 27, 1984

[54] HANDCART FOR BANQUET TABLES

[76] Inventors: Thomas A. Rodriguez, 203 Chapel Dr.; Angelo J. Zavaglia, 809 St. Clair, both of Collinsville, Ill. 62234

[21] Appl. No.: 314,653

[22] Filed: Oct. 26, 1981

[51] Int. Cl.³ .......................... B62B 1/12; B62B 1/14
[52] U.S. Cl. ................................ 414/447; 280/47.29; 414/457
[58] Field of Search ............... 414/444, 447, 457, 490; 280/47.13 R, 47.17, 47.24, 47.27, 47.28, 47.29

[56] References Cited

U.S. PATENT DOCUMENTS

| 772,883 | 10/1904 | Hines . |
| 1,436,665 | 11/1922 | Monroe . |
| 2,507,612 | 5/1950 | Rankin ........................ 280/47.29 X |
| 2,520,606 | 8/1950 | McLoughlin . |
| 2,681,740 | 6/1954 | Schueler . |
| 2,782,947 | 2/1957 | Linsel ................................. 414/447 |
| 2,983,520 | 5/1961 | Klages . |
| 3,467,405 | 9/1969 | Fogg . |
| 3,885,687 | 5/1975 | Blas . |

Primary Examiner—Robert G. Sheridan
Attorney, Agent, or Firm—Glenn K. Robbins

[57] ABSTRACT

A handcart for banquet tables and the like. The handcart has a main support shaft supported on wheels with a handle portion at one end and a transverse cradle like member at the opposite end engageable with a cross leg brace of the table. The handcart may be operated to lift one end of the table with the handcart cradle and then support the table by a collapsible rigid table brace supported by the shaft between the handle portion and the handcart wheels. The table completely supported and balanced upon the handcart may then be moved with all legs off the ground by grasping the end of the table near the handle portion and moving it like a wheelbarrow.

7 Claims, 5 Drawing Figures

HANDCART FOR BANQUET TABLES

BACKGROUND OF THE INVENTION

In the past the movement of banquet tables has necessitated a substantial amount of labor and time. Banquet tables of the popular type in widespread use have a long rather narrow table surface supported at each end by a pair of legs having a horizontal cross brace near the bottom. Such legs are usually collapsible and are adapted to be easily broken down after use and stored as desired or moved to different areas.

Conventionally after use in a banquet such banquet tables are either collapsed and moved to a storage area or may be moved by two workers who must each support an end of the table and move it to the desired area.

Either of the above operations require a substantial amount of time and effort. It will be readily appreciated that banquethalls, restaurants, clubs and the like that must set up, break up or otherwise change the banquet table arrangements periodically entail a great amount of time and labor in the aforementioned operations.

SUMMARY OF THE INVENTION

By means of the instant invention a wheeled handcart specifically designated for use with banquet tables and other tables of similar structure has been devised. The banquet table makes it possible for one man to place the handcart under the cross brace of a pair of legs at one end of the table and support the underside of the table upon a table support of the cart. With the table so supported, the worker than simply grasps the other end of the table and moves the table to any desired area.

In the aforementioned operation the worker may stack folding banquet chairs upon the table or any other type of load. This greatly facilitates the set up and break down of a banquet or the like as one man can efficiently set up or clear the table and chair arrangement with a minimum of time and labor.

The handcart is of simple construction which may be easily manufactured to provide a stable yet inexpensive structure. It is comprised of a long tubular shaft having a handle portion at one end and a table leg engaging portion at the other end which is adapted to bear under and support the horizontal cross brace of the end legs at one end of the table.

In order to provide for wheeled movement a pair of wheels are connected to the shaft and are supported thereunder at an intermediate portion. A rigid table support brace is connected to the top portion of the shaft between the handle portion and the wheels. The table support brace is pivotally connected to the shaft in order that it may collapse along the shaft when not in use.

The table support is adapted to be raised when the handcart is wheeled under the table with the leg brace engaging portion supporting the leg brace and slightly lifted. When so raised, it is positioned to bear against the underside of the table and may be held in this position by a lock member.

In the table supported position with one end of the table lifted slightly off the floor the table is in fully supported position by the handcart. The worker may then simply grasp the unsupported end of the table and lift it slightly off the floor in such a manner that the legs at both ends of the table are off the floor and the table is fully supported upon the wheels of the handcart.

In the fully supported position the worker may move the table, much as a wheelbarrow is moved, and can maneuver the table to any desired area. The table may be loaded with chairs or other articles which may be employed in the banquet arrangement to facilitate greatly the setting up or dismantling of the banquethall arrangement.

The handcart may be simply employed by a worker to support the table and remove the handcart after the desired use in a matter of seconds. The operation is rugged and efficient and can be effected without any special technique or training to present an adaptability for use in any type of situation where required to realize saving of time and labor.

The above features are objects of this invention. Further objects will appear in the detailed description of the invention which follows and will be otherwise apparent to those skilled in the art.

For the purpose of illustration of this invention there is shown in the accompanying drawing a preferred embodiment. It is to be understood that this is for the purpose of example only and that the invention is not limited thereto.

IN THE DRAWING

DESCRIPTION OF THE INVENTION

Figure 4:
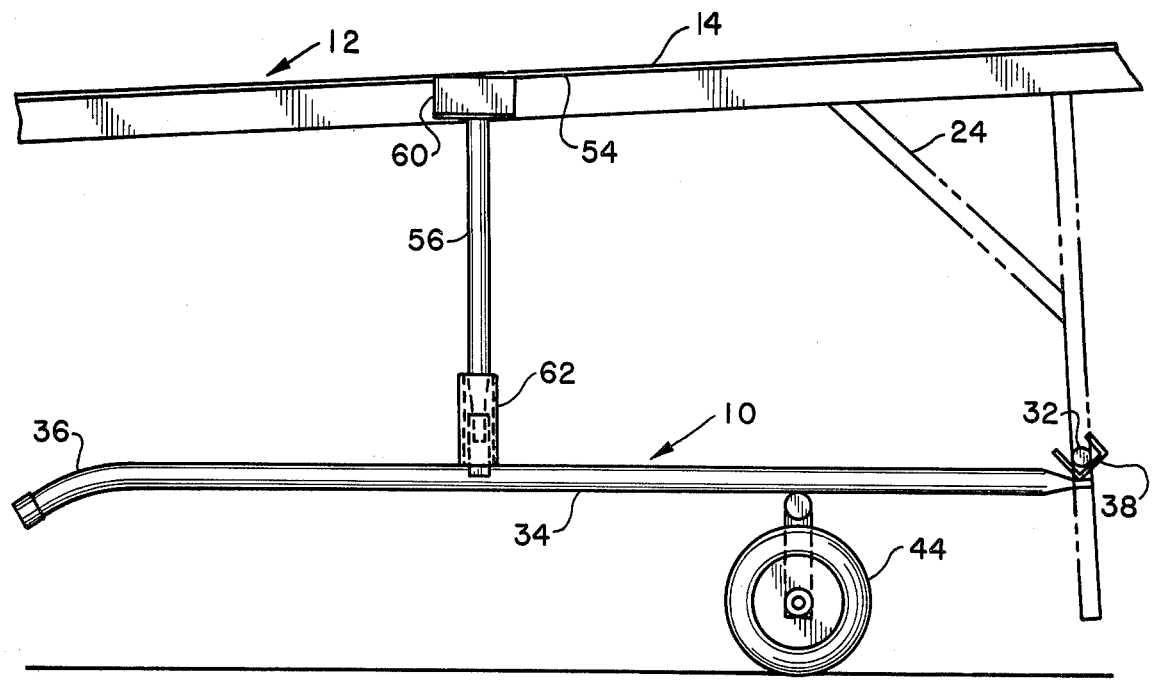
FIG. 4 is a side view showing the handcart extended in table supporting position.
Figure 5:
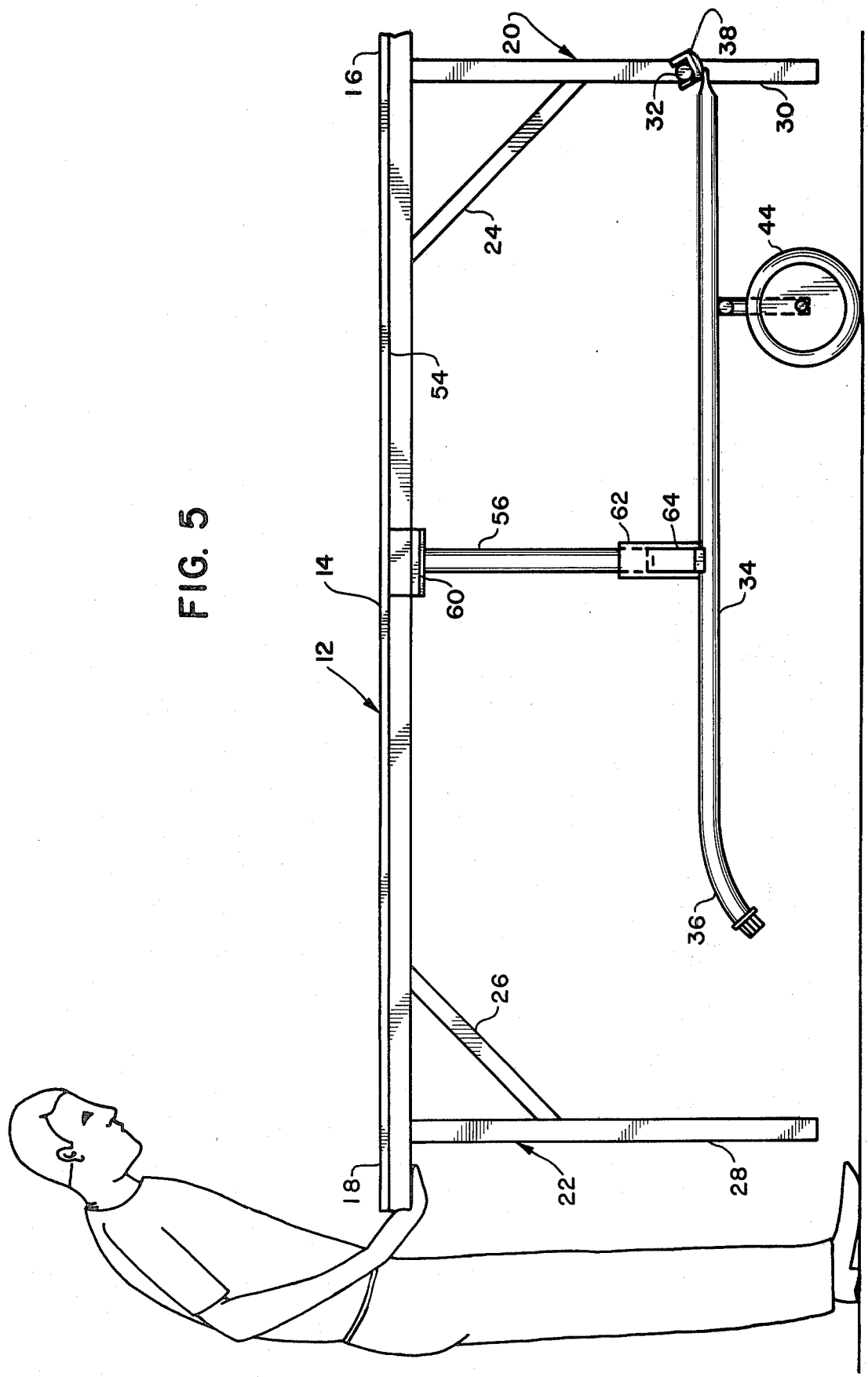
FIG. 5 is a side view similar to FIG. 4 showing the table fully supported by the handcart and moveable thereon by a user.

The handcart of this invention is generally indentified by the reference numeral 10 in the drawing. The handcart is specifically designed for use with a banquet table or the like 12 which is of conventional structure as shown in FIGS. 3, 4 and 5.

The banquet table has a table surface 14 and first and second ends 16 and 18 respectively. A pair of folding legs 20 and 22 are supported at each end by hinges 24 and 26. The leg pairs are identical in construction and are each comprised of legs 28 and 30 connected by a horizontal or transverse brace 32 at a point spaced above the bottom of the legs and at a short distance above the ground. This cross brace provides a convenient support for the handcart in the table lifting or jacking operation as will more fully appear hereinbelow.

This handcart is comprised of a rigid elongated shaft 34 which may be of tubular steel for rigidity and strength or of other conventional material of construction. The shaft has a handle portion 36 at one end and a transverse table leg brace engaging or lift member 38 at the opposite end. The leg brace engaging member is conveniently of L-shaped angle iron construction to serve as a cradle for the leg brace.

Figure 2:
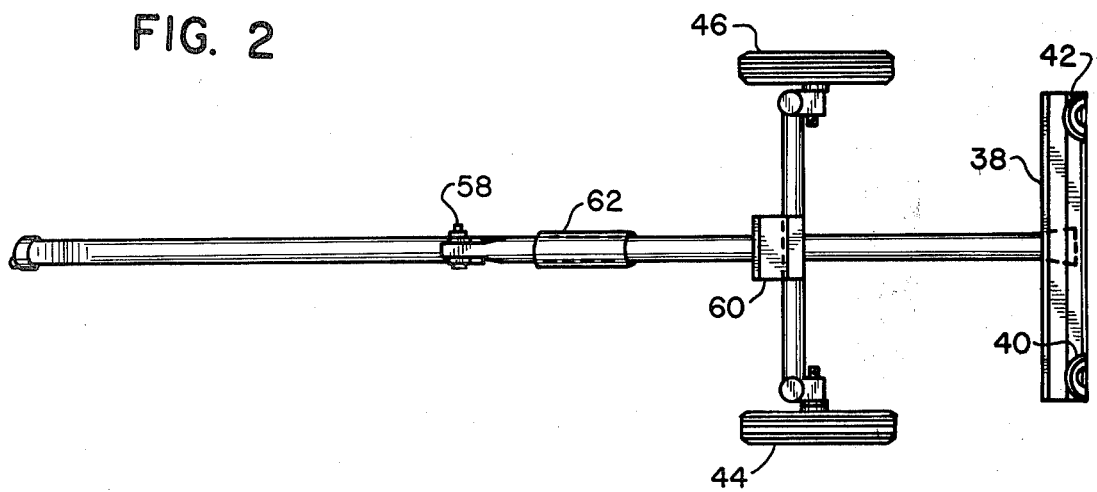
FIG. 2 is a top plan view.
Figure 3:
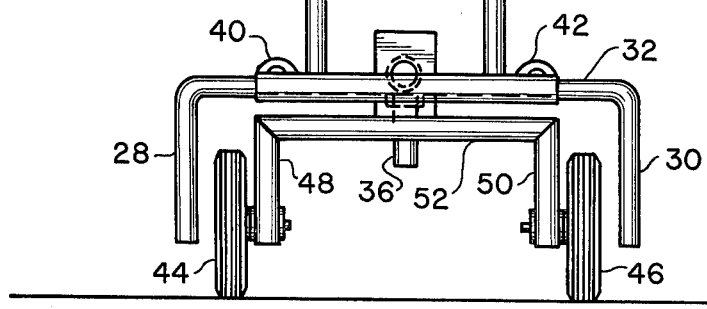
FIG. 3 is a view in front elevation showing the table.

In order to provide for stability in supporting the table leg brace a pair of upstanding stops 40 and 42 are welded to the front of the transverse leg brace engaging lift 38 as best shown in FIGS. 2 and 3.

In order to support the handcart 10 for wheeled movement, wheels 44 and 46 are provided. The wheels are supported underneath the shaft to provide a powerful lifting moment to lift the table. The wheels are journalled in vertical support extensions 48 and 50 which are welded to a transverse wheel support rod 52 which in turn is welded to the handcart shaft at an intermediate portion.

Figure 1:
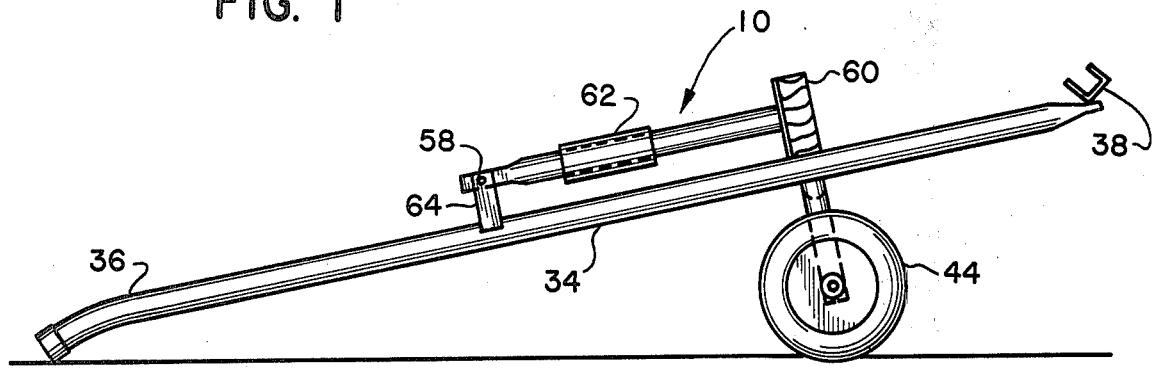
FIG. 1 is a view in side elevation of the handcart.

In order to support the underside 54 of the table a table engaging support rod or brace 56 is provided as best shown in FIGS. 1, 4, and 5. The rod is pivotally connected by pivot 58 to the handcart shaft between the wheels and the handle portion to provide support for the table on the opposite sides of the wheels.

A table engaging pad 60 is connected to the top of the table brace to provide a stable support to distribute the load from the weight of the table and any objects placed upon it in the way of cargo. The table pad may be made of wood or other material to prevent damage to the underside of the table and where desired a soft or resilient cover may be placed on top of the pad.

The table engaging brace is collapsible to a position of rest along the side of the handcart shaft. In the erect position shown in FIGS. 4 and 5, a sleeve lock 62 comprised of a tubular sleeve is employed to lock the table brace 56 in vertical locked position. This sleeve which may be elliptical in cross-section fits over an upstanding support lug 64 connected to the handcart shaft and pivot pin 58 which pivotably connects the table engaging brace to the support lug. The sleeve lock rides loosely on the handcart shaft in the table brace collapsible position shown in FIGS. 1 and 2 and may be simply engaged and disengaged between the lock and unlock positions.

USE

The handcart is very simply employed in use. The banquet table to be moved may first be loaded with chairs to be cleared from the area or in the case of initial set up may be moved to the area as desired. It will be understood that other types of load may also be placed upon the table to provide a wide adaptability in moving capability.

To engage the banquet table the handcart in the table brace collapsed position is moved by grasping the handle portion from one side of the table 12 between the ends 16 and 18. The handcart is then turned and moved as shown in FIG. 5 toward the table end 16. The workman by manipulating the handle portion of the handcart then turns the handcart toward the table end 16. The transverse angle iron cradle 38 is moved under the table leg cross brace 32 by raising the handle portion of the handcart.

With the cross brace cradled and retained by the stops 40 and 42 the handle portion of the handcart is lowered to raise the cradle 38 causing the table end 16 to be raised or picked up from the floor. In this position with the table end still supported upon the floor the table engaging brace 56 is moved to the vertical table supporting position shown in FIG. 5. In this position the table engaging pad 60 is moved into engagement with the under table surface 54. The brace is then locked in position by moving the sleeve lock over the pivot 58 and support lug.

In the table supportive position as described, the table is completely supported between the table brace and the leg cradle on either side of the wheels and is well balanced. The workman may then simply lift the table end 18 to move both ends of the table off the floor as shown in FIG. 5 where the bottom of the opposite end leg pairs are off the floor. The workman then moves the table by grasping the table end 18 and moving it on the handcart to any desired area. The movement is carried out much in the fashion of a wheelbarrow.

After the table has been moved as desired the handcart is simply disengaged by resting the table end upon the floor. The table brace is simply disengaged by maintaining pressure on the handle portion and disengaging the sleeve lock by simply raising it and moving the brace clockwise as shown in FIG. 5 to the collapsed position shown in FIG. 1. The table end 20 is then lowered by slowly relieving the pressure on the handle portion until the leg pair 20 is supported on the floor. The handle portion is then further elevated to disengage the leg brace cradle 38 from the leg brace and the handcart is pulled out from underneath the table to complete the operation.

The handcart in the collapsed condition may be simply stored. The collapsible leg brace since it lies parallel to the handcart shaft provides a low silhouette and is easily storable.

The handcart may be used for banquet tables or other tables of similar construction having a transverse leg brace and it will be appreciated that when speaking of banquet tables, other such tables may be used. Also, it will be understood that although banquet tables are predominantly of standard height and leg pair and leg brace construction and dimension the handcart may be employed for different sizes and where necessary the length of the cross brace and the vertical wheel support length may be varied or adjusted such as by telescopic adjustment or the like.

Various changes and modifications may be made in this invention as will be obvious to those skilled in the art. Such changes and modifcations are within the scope and teaching of the invention as defined by the claims appended hereto.

What is claimed is:

1. A handcart for banquet tables or the like having a flat table surface and at least one set of an end pair of table legs supporting said table surface in which said pair of table legs are braced by a horizontal leg brace spaced above the bottom of said legs and extending therebetween, said handcart being comprised of an elongated shaft having a handle portion at one end and a leg brace engaging portion at an opposite end, a pair of floor engaging wheels rotatably supported by said shaft intermediate said ends and table engaging support means connected to said shaft, said table engaging support means being comprised of a rigid member having one end connected to said shaft and an opposite end engageable with a under surface of the table in supporting relation thereto, said rigid member being relatively moveable with respect to said shaft into and out of engagement with said under surface of the table and said leg brace engaging portion being comprised of a rigid transverse cradle member which receives a major portion of the horizontal leg brace in cradled relation.

2. A handcart for banquet tables or the like having a flat table surface and at least one set of an end pair of table legs supporting said table surface in which said pair of table legs are braced by a horizontal leg brace spaced above the bottom of said legs and extending therebetween, said handcart being comprised of an elongated shaft having a handle portion at one end and a leg brace engaging portion at an opposite end, a pair of floor engaging wheels rotatably supported by said shaft intermediate said ends and table engaging support means connected to said shaft, said table support means being comprised of an elongated rigid member pivotally connected to an intermediate portion of said shaft and moveable from a collapsed position substantially parallel to said shaft to a substantially load bearing position into engagement with an underside of said table.

3. The handcart of claim 2 in which said rigid member is pivotally connected to an upstanding element supported on said shaft and a locking means is provided to lock said rigid member in the load bearing position.

4. The handcart of claim 3 in which said lock is comprised of a rigid loose fitting sleeve member slidably supported on said rigid member and slidable over the pivot connection and upstanding support element to provide a lock therefore in the load bearing position.

5. The handcart of claim 2 in which said rigid member is provided with a block-like table engaging pad member which is engageable with an underside of the table in the load bearing position to distribute evenly the load thereon.

6. A handcart for banquet tables or the like having a flat table surface and at least one set of an end pair of table legs supporting said table surface in which said pair of table legs are braced by a horizontal leg brace spaced above the bottom of said legs and extending therebetween, said handcart being comprised of an elongated shaft having a handle portion at one end and a leg brace engaging portion at an opposite end, a pair of floor engaging wheels rotatably supported by said shaft intermediate said ends and table engaging support means connected to said shaft, means are provided for supporting said wheels below said shaft and said table engaging support means being connected to said shaft between the handle portion and said wheels, said table engaging support means being comprised of an elongated rigid member pivotally connected to an intermediate portion of said shaft and moveable from a collapsed position substantially parallel to said shaft to a substantially load bearing position into engagement with an underside of said table.

7. The handcart of claim 6 in which said leg brace engaging portion is comprised of a rigid transverse cradle member which receives the horizontal leg brace.

* * * * *